United States Patent [19]

Yoshioka

[11] Patent Number: 4,846,188
[45] Date of Patent: Jul. 11, 1989

[54] ULTRASONIC IMAGING APPARATUS

[75] Inventor: Yoshihisa Yoshioka, Nishinasunomachi, Japan

[73] Assignee: Kabushiki Kaisha Toshiba, Kawasaki, Japan

[21] Appl. No.: 208,080

[22] Filed: Jun. 17, 1988

[30] Foreign Application Priority Data

Jun. 22, 1987 [JP] Japan ................................ 62-154881

[51] Int. Cl.⁴ .............................................. A61B 8/00
[52] U.S. Cl. ........................... 128/661.01; 128/660.05; 73/676
[58] Field of Search ....................... 128/660.04–660.05, 128/661.01, 661.08–661.11; 73/626

[56] References Cited

U.S. PATENT DOCUMENTS

| | | | |
|---|---|---|---|
| 4,159,462 | 6/1979 | Rocha et al. | 128/661.01 X |
| 4,372,323 | 2/1983 | Takemura et al. | 128/661.01 |
| 4,463,763 | 8/1984 | Koyano et al. | 128/660.04 |
| 4,649,927 | 3/1987 | Fehr et al. | 128/661.01 |

Primary Examiner—Francis Jaworski
Attorney, Agent, or Firm—Oblon, Spivak, McClelland, Maier & Neustadt

[57] ABSTRACT

An ultrasonic imaging apparatus comprises an ultrasonic transducer adapted for repeatedly scanning the same sub-region over sub-periods of one of plural heartbeat periods defined by heartbeat signals supplied from an electrocardiograph, and a memory having a plurality of frame-storage areas each for sequentially storing image signals obtained during corresponding sub-periods of different heartbeat periods. When image signals for the entire scan region, obtained over the heartbeat periods, are stored in each frame storage area, a one-frame image signal is read out and displayed on a television monitor.

12 Claims, 5 Drawing Sheets

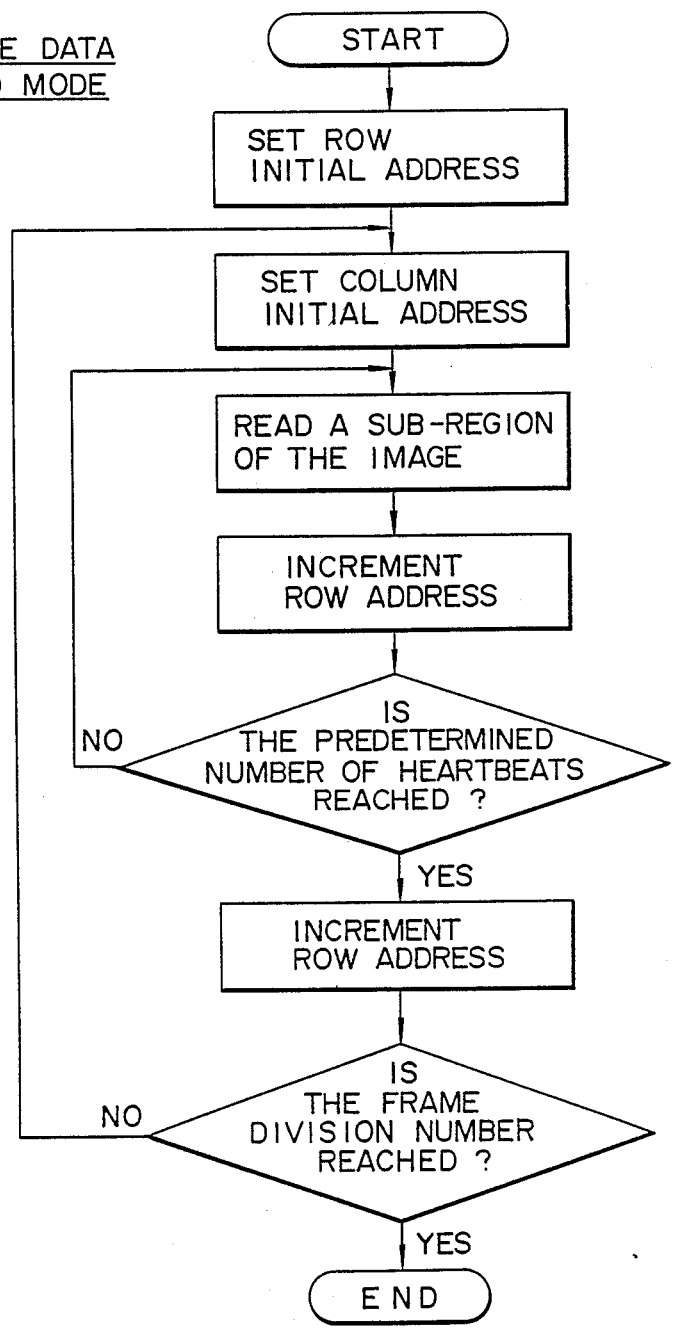
F I G. 5

ULTRASONIC IMAGING APPARATUS

BACKGROUND OF THE INVENTION

1. Field of the Invention

The present invention relates to an ultrasonic imaging apparatus for displaying a B-mode image or two-dimensional image of blood-flow velocity, using ultrasonic waves and, more particularly, to an ultrasonic imaging apparatus which, with the aid of its visual image, is well suited for examining the heart of a patient.

2. Description of the Related Art

An ultrasonic diagnosis apparatus for forming a B-mode image by means of the ultrasonic imaging technique makes use of an array ultrasonic transducer in which many ultrasonic transducer elements are arranged in a line. When linear scanning is performed by means of the array ultrasonic transducer, a fixed number of ultrasonic transducer elements are driven as a group. To focus an ultrasonic beam, in this case, the ultrasonic transducer elements forming the group are driven at different times; more precisely the transducers located at either end of the group are driven first, with the center transducer being the last to be driven. By driving the array transducer for each of transducer-element groups which are shifted in position one element by one element in the array direction, i.e., the scanning direction, ultrasonic beams corresponding to the respective transducer-element groups or scanning lines can be transmitted in sequence from the array ultrasonic transducer, so that a subject under examination is scanned by the ultrasonic beams.

Echo beams from the subject under examination are received by the same array ultrasonic transducer to be converted into echo signals. The echo signals are subjected to the same delay processing as that to which the transmitted ultrasonic beams were subjected, and are then converted into a tomograph image signal. The tomography image signal is supplied to a TV monitor device, and a tomograph image is visually displayed.

When, on the other hand, sector scanning is performed, the ultrasonic beams are sequentially transmitted from the ultrasonic transducer in such a way that the subject under examination is scanned in sector fashion, with a given point being designated as the center. In this case, the ultrasonic transducer elements are driven at different times, according to their scanning direction, so that the steering direction of the ultrasonic beam is changed for each scanning line.

In addition to the linear scanning and the sector scanning system as described above, there is a mechanical scanning system in which an ultrasonic transducer is mounted on a mechanical scanning device and is moved thereby to perform ultrasonic scanning.

Ultrasonic echo signals of a subject under examination, obtained by ultrasonic scanning carried out in accordance with the above scanning systems, are processed to produce an image signal which, in general, is visually displayed as a B-mode image (tomograph image).

The blood-flow imaging technique for displaying a blood flow profile has been made feasible owing to the ultrasonic imaging apparatus. The Doppler method is generally used for the blood flow imaging. This is a method for detecting moving substances, such as blood flow, within a living subject utilizing the Doppler effect.

The basic principle of the Doppler method is as follows:

When the blood flow within a living subject is subjected to ultrasonic waves, blood corpuscles are caused to vibrate slightly while moving, and reflect the ultrasonic waves. Thus, the frequency of the reflected waves becomes slightly higher that that of the transmitted waves because of the Doppler effect. Such a frequency shift can be detected, the amount of change in the frequency being referred to as the Doppler shift frequency. Since the Doppler shift frequency is in proportion to the blood-flow velocity, this enables the blood flow conditions to be then be clearly observed.

According to a conventional blood-flow imaging apparatus working on the above principle to obtain blood-flow information, a predetermined number of ultrasonic pulses are repeatedly transmitted in a given direction, and the resulting echo waves are converted in sequence, into echo signals. The echo signals are then phase detected to obtain phase information signals which are in turn digitized and supplied to a digital filter, which removes therefrom signal components corresponding to entirely or virtually motionless parts within the living subject. The signals passed through the digital filter are frequency-analyzed to detect the Doppler shift frequency corresponding to the blood-flow velocity. The Doppler shift frequency is used as blood-flow information for forming a two-dimensional image or profile of the blood-flow velocity. The blood-flow information may be displayed on a TV monitor, either independently or superposed on B-mode or M-mode information.

To simultaneously display a two-dimensional image of blood-flow velocity, superposed on the B-mode or M-mode image, a Doppler information detecting transducer is provided, separated from or integrated with a linear- or sector-scanning array ultrasonic transducer. For instance, ultrasonic waves are transmitted to a subject in accordance with the sector scan to obtain B-mode information, and ultrasonic pulses are transmitted to the subject to obtain Doppler information. The thus obtained B-mode information and Doppler information are superposed and displayed on the monitor TV.

In order to display Doppler information a a two-dimensional image of blood-flow velocity, a large amount of data must be produced. For this reason, a considerable scanning time is required in order to obtain one frame of image information.

SUMMARY OF THE INVENTION

It is an object of this invention to provide an ultrasonic imaging apparatus which is capable of minimizing a distortion of an image due to a time difference between the steering lines forming the image displayed on a screen on diagnosis.

According to the invention, each of a plurality of heartbeat-periods is divided into a plurality of sub-periods, and the same sub-region of region interest is repeatedly scanned over the sub-periods of one of heartbeat periods defined by heartbeat signals. Image signals obtained in corresponding sub-periods of different heartbeat periods are sequentially stored in storage areas, corresponding to scan regions, of frame memories. When image signals for the entire scan region, obtained over the heartbeat periods, are stored in each frame storage area, a one-frame image signal is read out and displayed on a television monitor.

BRIEF DESCRIPTION OF THE DRAWINGS

FIGS. 4 and 5 are flowcharts for explaining the operation of the apparatus shown in FIG. 3.

DETAILED DESCRIPTION OF THE PREFERRED EMBODIMENTS

The principle underlying the present invention will first be described, with reference to FIG. 1, prior to the actual description of the embodiment thereof.

Waveforms A represent heartbeat waveforms obtained by an electrocardiograph attached to a subject under examination. It is assumed that a time after a delay of time td from the peak of a heartbeat provides a reference point of time for R waves, and the ultrasonic scan is started at this reference point of time. Patterns B represent regions to be scanned and memory areas of frame memories.

Figure 1:
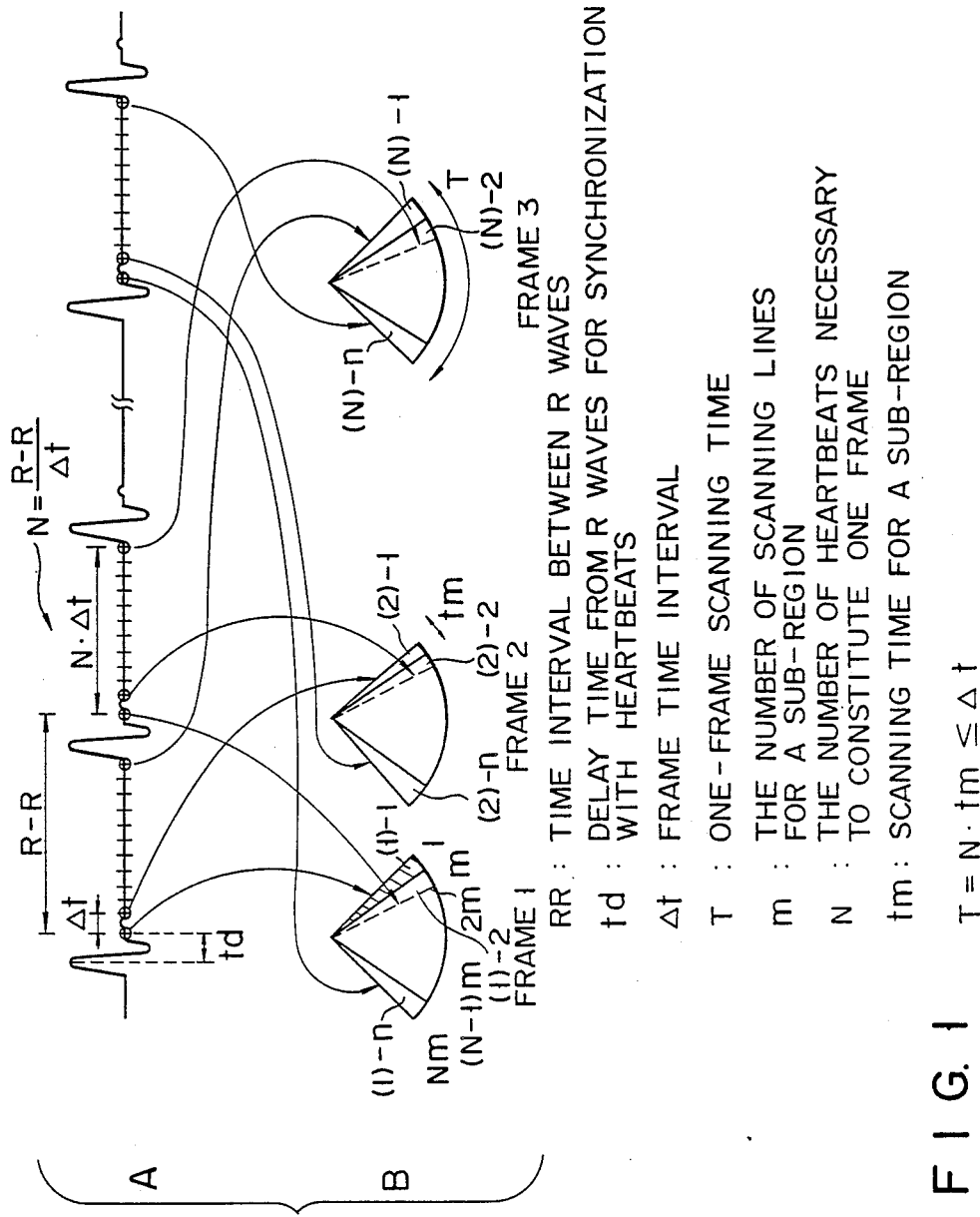
FIG. 1 is a diagrammatic illustration useful for explaining the principle underlying the present invention.

First, in the first heartbeat period, the first sub-region, represented by steering lines 1∼m within a sector scanning region shown at B in FIG. 1, is scanned during the first sub-period Δt immediately following the reference point of time for R waves, and image signals resulting from the first scan are stored in a memory area (1)-1 (first frame 1) corresponding to the sub-region (1∼m). Next, during the second sub-period Δt, the same sub-region (1∼m) is scanned again, and the resulting image signals are stored in a memory area (2)-1 (second frame 2) corresponding to the sub-region (1∼m).

As can be seen from the foregoing, during the first heartbeat period, the sub-region (1∼m) is repeatedly scanned N times corresponding to N subperiods, and the image signals resulting from these scanning operations are sequentially stored in memory areas (1)-1 through (N)-1 of frames 1 through N.

When the storing of image signals in memory area (N)-1 is complete and the next heartbeat signal is generated, sub-region (m+1∼2m) adjacent to sub-region (1∼m) is scanned during the first sub-period Δt of the next heartbeat period of NΔt, and the resultant image signals are stored in the memory area (1)-2 of the first frame 1. The same sub-region (m+1∼2m) is again scanned during the next Δt sub-period, and the resultant image signals are then stored in memory area (2)-2 of frame 2. In this manner, sub-region (m+1∼2m) is repeatedly scanned, and the resultant image signals are sequentially stored in memory area (1)-2 of frame 1 through memory area (N)-2 of frame memory N.

As described above, the same sub-region of a scanned region is scanned plural times during each heartbeat period, and image signals resulting from the scanning operations are sequentially stored in corresponding memory areas of plural memories. According to such a scanning scheme, for instance, in frame 1 shown in FIG. 1, sub-regions (1∼m) through (N-l)m∼Nm are each scanned during the first sub-period of each of the successive heartbeat periods. Where successive heartbeat waveforms are employed for scanning the sub-regions, variation with time of a part or of tissue within a living subject, observed among corresponding sub-periods, would be considerably small as compared with that observed between the first and last sub-periods in one heartbeat period. Accordingly, when one frame is composed of image signals obtained by scans during first sub-periods of the successive heartbeat periods as described above, a time difference involved in one frame, or a time difference between the first steering line and the last steering line will be Δt at most. This is quite small.

Figure 2:
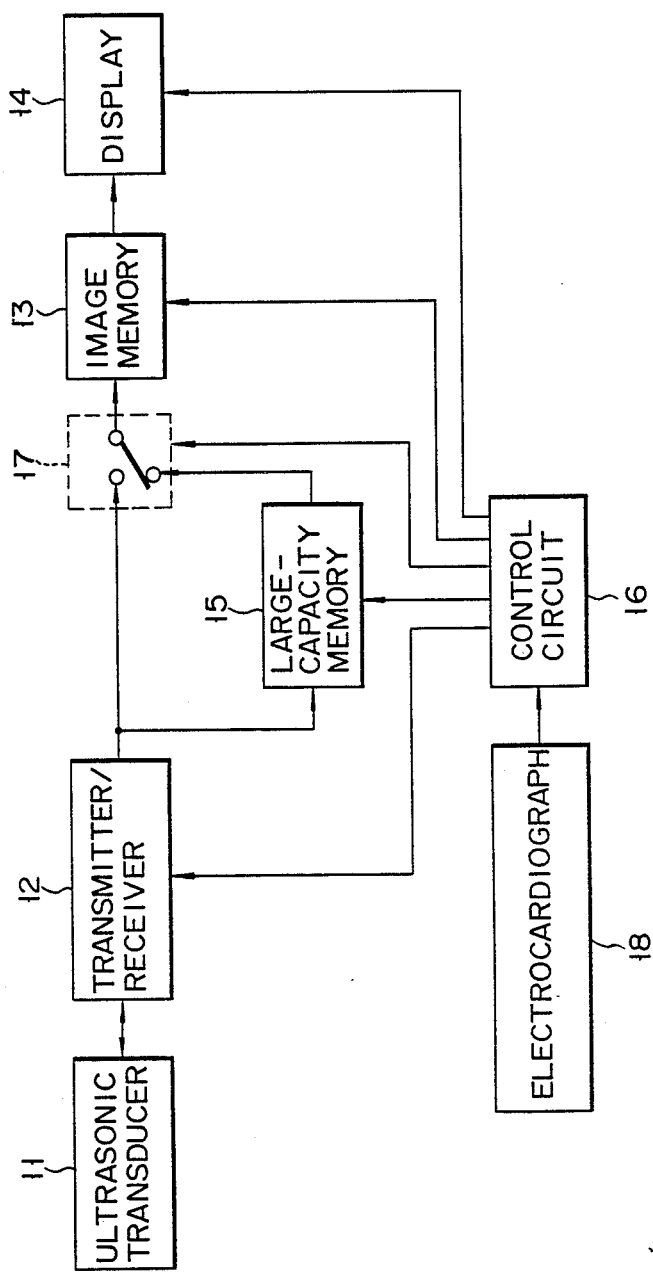
FIG. 2 is a simplified block diagram of the ultrasonic imaging apparatus adapted for realizing the principle of this invention.

An ultrasonic imaging apparatus for realizing the above principle will now be outlined, with reference to FIG. 2.

An ultrasonic transducer 11 is coupled to a transmitter/receiver circuit 12. Transducer 11 is formed of an array made up of a plurality of ultrasonic transducer elements, and comprises a transducer section adapted for sector scanning in order to acquire B- or M- mode information, and another transducer section for obtaining Doppler information. These transducer sections may be separate from or integral with each other, as desired.

Transmitter/receiver circuit 12 comprises a circuit means for applying driving signals to ultrasonic transducer 11, to obtain the B- or M-mode information and the Doppler information, and a circuit means for receiving from transducer 11 echo signals corresponding to the B- or M-mode information and Doppler signals corresponding to the Doppler information, which are subjected to amplification and detection therein. Transmitter/receiver circuit 12 further comprises a circuit means for digitizing the B- or M-mode signals, and additionally includes circuit means for phase-detecting the Doppler signals, digitizing phase-detected signals, filtering digital phase-detected signals, frequency-analyzing filtered digital phase-detected signals, and providing blood-flow information.

The output of transmitter/receiver circuit 12 is coupled to a data input terminal of a large-capacity memory 15, and to an input terminal of a switch circuit 17. A data output terminal of memory 15 is coupled to another input terminal of switch circuit 17.

The output of switch circuit 17 is coupled to an frame memory 13 which has a storage capacity sufficient to store one frame of a sector B-mode image. Either image information read from memory 15 or image information output from transmitter/receiver circuit 12 is selectively supplied to frame memory 13 via switch circuit 17 controlled by a control circuit 16, so that one frame of a sector B-mode image is formed, and then displayed by a display device 14.

To control transmitter/receiver circuit 12, switch circuit 17, frame memory 13, and display device 14, control circuit 16 is coupled to these units. Control circuit 16 is also coupled to an electrocardiograph 18 attached to a subject under examination to receive heartbeat signals therefrom.

In the arrangement as shown in FIG. 2, upon receipt of a heartbeat signal from electrocardiograph 18, control circuit 16 sends a scan starting signal to transmitter/receiver circuit 12 at a point of time delayed by td from the first peak of heatbeats, shown in FIG. 1. In response to the scan starting signal, transmitter/receiver circuit 12 drives ultrasonic transducer 11 so as to repeatedly scan the sub-region (1∼m) of the sector region shown in FIG. 1. Image signals supplied, during the first sub-period of Δt, from transmitter/receiver circuit 12, as a result of scanning the sub-region (1∼m), and corresponding to scanning lines 1∼m, are stored in the memory area (1)-1 of large-capacity memory 15, and image signals output from circuit 12 during the next sub-period of Δt, and once again corresponding to scanning lines 1~m, are stored in the memory area (2)-1 of memory 15. In this manner, image signals obtained by repeatedly scanning the sub-region (1~m) are sequentially stored in memory areas (1)-1 through (N)-1 of large-capacity memory 15.

When the next heartbeat signal is supplied from electrocardiograph 18 to control circuit 16, transmitter/receiver circuit 12 responds to a scan starting signal issued by control circuit 16, to drive ultrasonic transducer 11, thereby to repeatedly scan the sub-region (m+1~2m). Transmitter/receiver circuit 12 produces image signals for the sub-region (m+1~2m) at Δt intervals, which correspond to lines m+1 to 2m, and are in turn stored in memory areas (1)-2 through (N)-2 of large-capacity memory 15.

After all the sub-regions (1~m) to ((N-1)m~Nm) of the sector region have been repeatedly scanned, and all the image signals stored in large-capacity memory 15, the image signals are then read out therefrom, frame by frame, and stored in frame memory 13. The image signals stored in frame memory 13 are read out and supplied to display device 14, so that a sector tomograph image is visually displayed on display device 14. It should be noted that a time difference between the first line image and last line image of the displayed image is no more than Δt between the first scanning line 1 and the last scanning line Nm.

Figure 3:
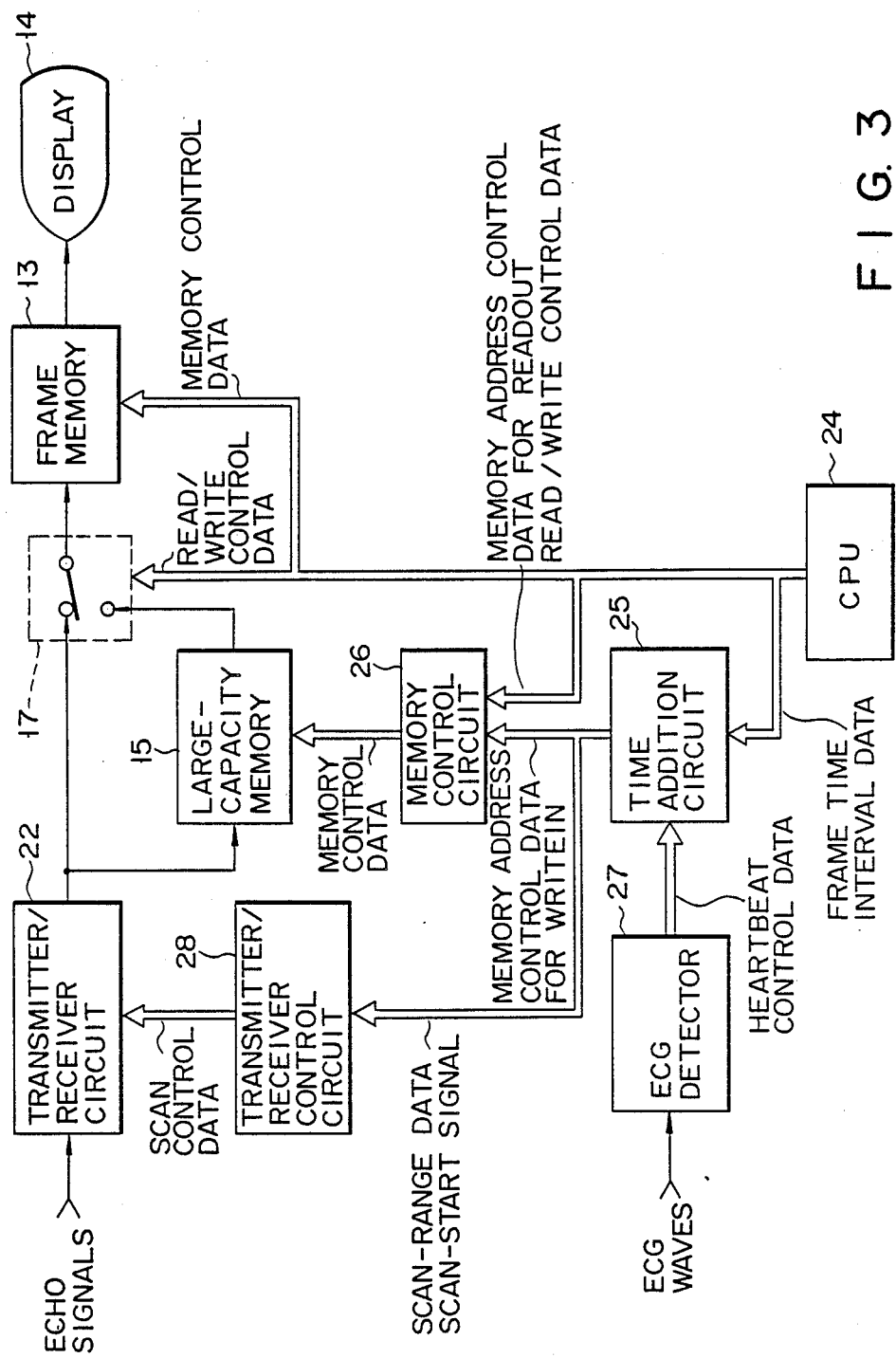
FIG. 3 is a block diagram of the ultrasonic imaging apparatus for implementing the present invention.

FIG. 3 shows a specific circuit arrangement for carrying out the present invention. With this circuit arrangement, transmitter/receiver circuit 22 has its input coupled to ultrasonic transducer 11 and its output coupled to frame memory 13 via switch circuit 17.

CPU (central processor unit) 24 is provided for controlling various circuits in the ultrasonic imaging apparatus, and is coupled to switch circuit 17, frame memory 13, time-addition circuit 25, and memory control circuit 26. Time-addition circuit 25 is coupled to the output of ECG detecting circuit 27 for detecting the heartbeat signals supplied from electrocardiograph (ECG) 18, and adds the time td to a peak-occurring time in response to peak of the heartbeat signal, so as to determine a scan starting point of time and a scanning range corresponding to Δt.

The output of time-addition circuit 25 is coupled to transmitter/receiver control circuit 28 and memory control circuit 26. Transmitter/receiver control circuit 28 has its output coupled to the control input of transmitter/receiver circuit 22, so as to apply thereto scan control signals based on the scan starting signal and scanning-range data supplied from time-addition circuit 25. Memory control circuit 26 is coupled to large-capacity memory 15, so as to apply thereto memory control data, such as address data, in response to output data from CPU 24 and time-addition circuit 25.

Figure 4:
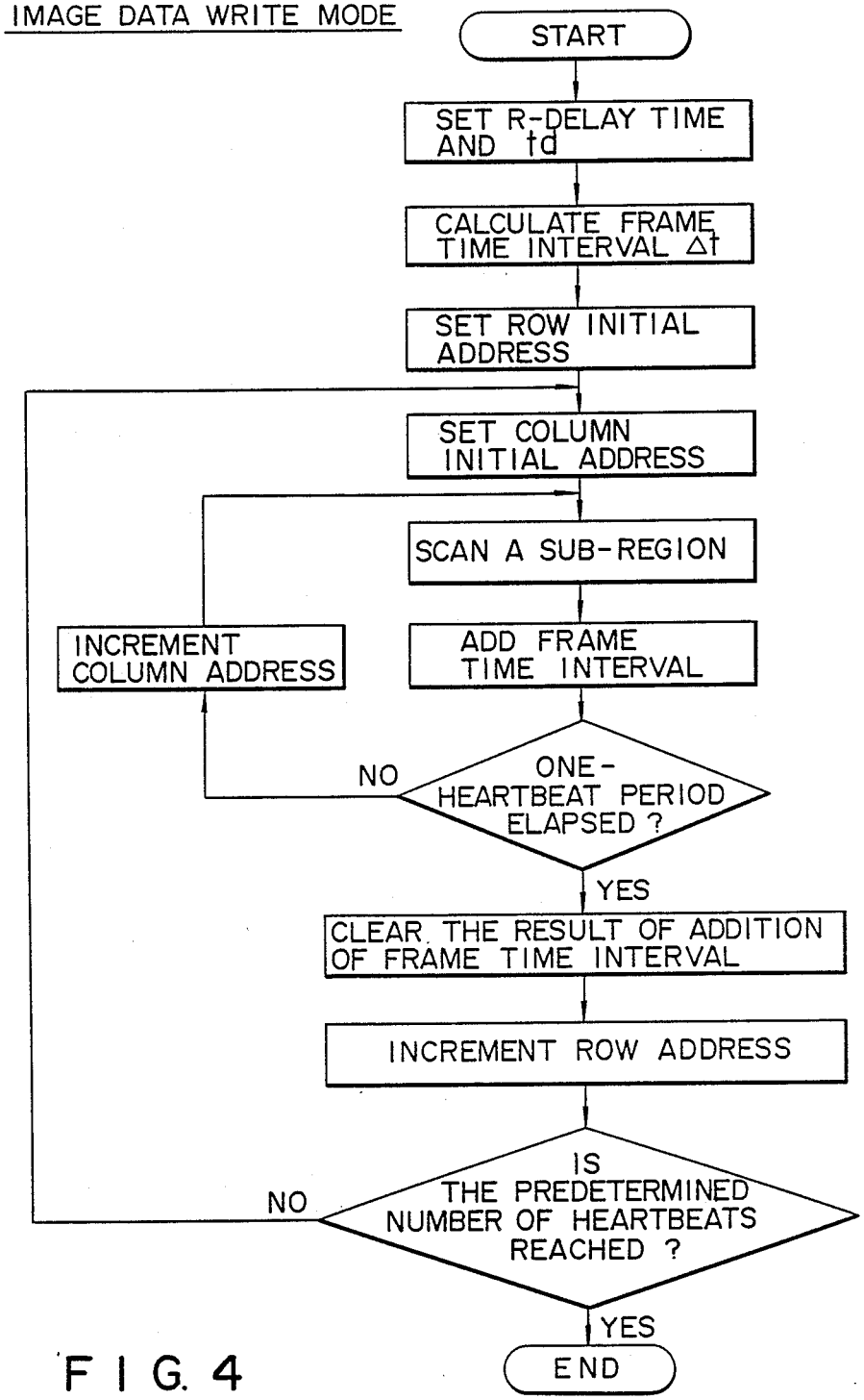

Referring now to the flowcharts of FIGS. 4 and 5, the operation of the FIG. 3 arrangement will now be described hereinafter.

In an image data write mode, when a start is made, CPU 24 determines time td and time Δt on the basis of heartbeat information which is previously obtained from a patient, and provides td data and Δt data to time-addition circuit 25. Time-addition circuit 25 adds the time td to a peak-occurring time of the heartbeat signals (waveforms A in FIG. 1) detected by ECG detecting circuit 27, to determine a scan-starting time, and then supplies a scan-starting signal and a scan range (Δt) signal to each of transmitter/receiver control circuit 28 and memory control circuit 26. In response to these signals, transmitter/receiver control circuit 28 provides scan control data indicative of the scan-starting time and the scan range to transmitter/receiver circuit 22.

In response to the scan-starting signal, memory control circuit 26 determines an initial value of row addresses and an initial value of column addresses for data writing, while in response to the scan control data from circuit 28, transmitter/receiver circuit 22 supplies, to ultrasonic transducer 11, driving pulses for scanning one sub-section, i.e., the sub-region (1~m), in order for B- or M-mode signals and Doppler signals to be acquired. In addition, transmitter/receiver circuit 22 processes echo signals from transducer 11, so as to provide B- or M-mode image signals and Doppler image signals corresponding to the sub-region (1~m) being scanned. When memory 15 is designated by initial values of row and column addresses, image signals for the sub-region (1~m) are stored in the memory area (1)-1 of memory 15, starting with the initial-value address.

Next, Δt is added to the previous time data by time-addition circuit 25, so that the scan starting data is updated. A decision is made by ECG detecting circuit 7 whether a heartbeat period has elapsed. If one heartbeat period is detected not to have elapsed, the memory address is incremented and the sub-region (1~m) is again scanned. At this time, image signals output from transmitter/receiver circuit 22 are stored in the memory area (2)-1 of memory 15. Thus, the same sub-region (1~m) is repeatedly scanned until one heartbeat period elapses, and the resulting image signals are in turn stored in memory areas (1)-1 through (N)-1 of memory 15.

When one heartbeat period elapses, the result of addition stored in time addition circuit 25 is cleared and the row address of memory control circuit 26 is incremented. A decision is made whether a predetermined number of heartbeats have occurred, i.e., whether the number of heartbeats needed to record image signals has been reached. If the present number of heartbeats which have so far occurred is below the predetermined number, initial value of column addresses of memory 15 are again set. Subsequently, the sub-region (m~2m) is repeatedly scanned until a next heartbeat period elapses. Image signals resulting from scanning the sub-region (m~2m) are in sequence stored in memory areas (1)-2 through (N)-2 of memory 15.

Thus, when the scanning of the last sub-region ((N-1)m~Nm) is completed the image data writing operation comes to an END.

Next, a description will be given of the operation to read the image data out of the large-capacity memory.

When a image data read mode is started, initial values of row and column addresses of memory 15 are set in memory control circuit 26 by CPU 24. In order to read from memory 15 the image data stored in the first memory area (1)-1 of the sector region (frame 1), memory control circuit 26 specifies the addresses of memory 15 starting at the initial address set as above. The image data read out of memory area (1)-1 is transferred via switch circuit 17 to frame memory 13 and stored therein.

When the read operation for the memory area (1)-1 is completed the row address is incremented. Since, at the present time, the number of heartbeats occurred is below the predetermined number, data is read out of the memory area (1)-2 of memory 15 in accordance with the updated row address. In this manner, data are sequentially read from memory areas (1)-1 through (1)-n and transferred to frame memory 13 to be stored therein. After being stored in frame memory 13, one-frame data is read into and displayed by display device 14.

When the frequency of data readout operations so far performed reach the predetermined number of heartbeats the column address is updated. At this time the readout of data in second frame 2 is initiated. To this end the initial value of row addresses for second frame 2 are first set in memory control circuit 26. Afterwards, as is the case with first frame 1, the data are sequentially read from memory areas (1)-2 through (N)-2 of second frame 2 and transferred to frame memory 13.

The above operations are performed repeatedly until the number of frames which have been read out reaches the frame-division number N. When the readout of the data in frame N is completed, the data readout operation comes to an end.

In the embodiment as described above, the image quality can be improved by increasing the number of scanning lines or data. In addition, by enlarging the scanning angle for the sector scan, it is possible to visually display a wide-angle image and hence increase the size of a region to be observed for diagnosis.

What is claimed is:

1. An ultrasonic imaging apparatus comprising:
   ultrasonic transducer means for transmitting ultrasonic beams to scan a predetermined region within a subject under examination and receiving echo waves of the ultrasonic beams, to provide echo signals;
   signal generating means for successively generating a plurality of signals for a plurality of periods, each signal corresponding to one of the periods;
   transmitting/receiving means coupled to said ultrasonic transducer means, for providing driving signals to said ultrasonic transducer means and processing the echo signals therefrom:
   control means coupled to said transmitting/receiving means, for controlling said transmitting/receiving means to repeatedly scan a plurality of sub-regions obtained by division of the region during the respective signal-generating periods, each scan of one of the sub-regions being performed during one of sub-periods obtained by division of one of the signal generating periods, and to acquire from said transmitting/receiving means a plurality of sub-frame image signals which correspond to the sub-regions and whose number corresponds to the frequency of the repeated scans of one of the sub-regions; and
   frame-image forming means for storing the sub-frame image signals from said transmitting/receiving means and forming a plurality of frame image signals each containing sub-frame image signals for the respective subregions.

2. An ultrasonic imaging apparatus according to claim 1, wherein said signal generating means is an electrocardiograph means adapted for attachment to the subject under examination, to provide heartbeat signals.

3. An ultrasonic imaging apparatus according to claim 1, wherein said control means includes means responsive to each of the signals provided from said signal generating means, for determining a scan starting point of time, and means for determining the sub-period during which a sub-region is scanned.

4. An ultrasonic imaging apparatus according to claim 1, wherein said frame-image forming means comprises storage means for storing the sub-frame image signals provided from said transmitting/receiving means, and means for addressing said storage means to store the sub-frame image signals in accordance with the sub-regions.

5. An ultrasonic imaging apparatus according to claim 4, wherein said storage means of said frame-image forming means has a plurality of frame-storage areas corresponding to a plurality of frames, and stores the sub-frame image signals in corresponding ones of said frame-storage areas.

6. An ultrasonic imaging apparatus according to claim 5, wherein said frame-image forming means includes a frame memory for storing a frame-image signal composed of the sub-frame signals stored in each of said frame storage areas of said storage means.

7. An ultrasonic imaging apparatus comprising:
   ultrasonic transducer means for transmitting ultrasonic beams to scan a region of interest within a subject under examination, receiving echo waves of the ultrasonic beams to provide echo signals, and converting the echo waves into echo signals;
   electrocardiograph means for generating a plurality of heartbeat signals corresponding to heartbeats of the subject over a plurality of heartbeat periods;
   transmitting/receiving means coupled to said ultrasonic transducer means, for providing driving signals to said ultrasonic transducer means and processing the echo signals from said ultrasonic transducer means, to provide an image signal;
   control means coupled to said transmitting/receiving means, for controlling said transmitting/receiving means to repeatedly scan one of a plurality of sub-regions obtained by division of the region of interest during a corresponding ones of the heartbeat periods, each scan of one of the sub-regions being performed during one of plural sub-periods obtained by division of one of the heartbeat periods, and to acquire from said transmitting/receiving means the image signal containing a plurality of sub-frame image signals which correspond to the sub-regions, and whose number corresponds to the frequency of the repeated scans of one of the sub-regions; and
   frame-image forming means for sequentially storing the sub-frame image signals from said transmitting/receiving means and forming a frame image signal in a predetermined period within the heartbeat periods.

8. An ultrasonic imaging apparatus according to claim 7, wherein said transmitting/receiving means provides to said ultrasonic transducer means driving signals for scanning the region of interest for each of a plurality of sub-sector regions, and said control means includes means responsive to each of the peaks of the heartbeat signals from said electrocardiograph means, to determine a sector-scan starting point of time for each of the sub-sector regions, and means for determining a scanning period during which a sub-sector region is to be scanned.

9. An ultrasonic imaging apparatus according to claim 8, wherein said scanning period determining means comprises means for adding time data indicative of a predetermined time to the scan starting point of time determined by said scan starting time determining means.

10. An ultrasonic imaging apparatus according to claim 8, wherein said frame-image forming means comprises storage means for storing the sub-frame image signals corresponding to the sub-sector regions, supplied from said transmitting/receiving means, and means for addressing said storage means to store the sub-frame image signals in accordance with the subsector regions.

11. An ultrasonic imaging apparatus according to claim 9, wherein said storage means of said frame-image forming means has a plurality of frame-storage areas corresponding to a plurality of frames, and stores the sub-frame image signals in corresponding ones of said frame-storage areas.

12. An ultrasonic imaging apparatus according to claim 11, wherein said frame-image forming means includes a frame memory for storing a frame-image signal composed of the sub-frame signals stored in each of said frame storage areas of said storage means.

* * * * *